United States Patent [19]
Wada et al.

[11] 3,895,028
[45] July 15, 1975

[54] ALPHA-(2-PHENYLBENZOTHIAZOL-5-YL)PROPIONIC ACID

[75] Inventors: Jin Wada, Koshigaya; Tadayuki Suzuki, Soka; Hiroki Miyamatsu, Chofu; Shinji Ueno, Tokyo; Mitsuhiro Shimizu, Chiba, all of Japan

[73] Assignee: Tokyo Tanabe Company, Ltd., Japan

[22] Filed: Aug. 16, 1973

[21] Appl. No.: 388,781

[30] Foreign Application Priority Data
Sept. 12, 1972 Japan.............................. 47-90895
Dec. 27, 1972 Japan............................ 47-129836
Apr. 18, 1973 Japan.............................. 48-43061

[52] U.S. Cl............... 260/304; 260/455 C; 424/270
[51] Int. Cl............................................ C07d 91/44
[58] Field of Search..................................... 260/304

[56] References Cited
UNITED STATES PATENTS
3,818,023  6/1974  Wada et al......................... 260/304

OTHER PUBLICATIONS
Elderfield (ed.), *Heterocyclic Compounds*, Vol. 5, pp. 506–508, (N.Y.C., John Wiley & Sons, 1957).

Wagner et al., *Synthetic Organic Chemistry*, N.Y. John Wiley & Sons, 1953, pp. 411–415, 426–429.

*Primary Examiner*—Richard J. Gallagher
*Attorney, Agent, or Firm*—McGlew and Tuttle

[57] ABSTRACT

The invention concerns α-methyl-2-phenyl-5-benzothiazolyl acetic acid and its acid addition salts and basic addition salts. The acetic acid compound has the following structural formula:

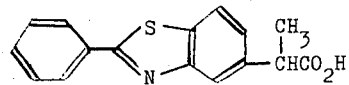

This new compound and its salts have a markedly lower toxicity and comparatively higher anti-inflammatory and analgesic activity compared with those of the previously disclosed 2-substituted-5 or 6-benzothiazolyl acetic acid compounds.

1 Claim, No Drawings

ALPHA-(2-PHENYLBENZOTHIAZOL-5-YL)PROPIONIC ACID

THE BACKGROUND OF THE INVENTION

1. The Field of the Invention

The present invention relates to a new benzothiazolyl compound. More particularly, it is concerned with α-methyl-2-phenyl-5-benzothiazolyl acetic acid. It relates further to the synthesis of compounds of this type. The α-Methyl-2-phenyl-5-benzothiazolyl acetic acid of this invention has the following structural formula:

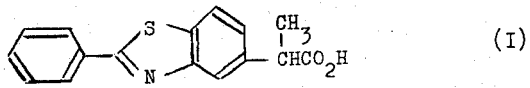

The new compound of the present invention has useful pharmacological properties, possessing good anti-inflammatory activity and analgesic.

2. Prior Art

Many medicaments have hitherto been known as having analgesic and anti-inflammatory activities. We have studied the chemical structures of some of these medicaments which are currently regarded as having good pharmacological properties and clinical results, and have supposed inductively therefrom that the benzothiazolyl acetic acid series of compounds which have previously not been synthesized should be more effective. Thus, several compounds of said series have been chemically synthesized and submitted to pharmacological and clinical tests, whereby 2-substituted-5 or 6-benzothiazolyl acetic acid compounds have been shown to be the most effective. Patent applications have already been filed concerning the above novel compounds and the synthesizing processes of the same (cf. Chemical Abstracts, 77, 19634w, German Offenlegungschrifts 2,145,178 and 2,238,761).

THE OBJECTS OF THE INVENTION

One of the objects of the present invention is a derivative of said 2-substituted-5-benzothiazolyl acetic acid having a markedly lower toxicity than those of the original benzothiazolyl acetic acid compounds. That is, α-methyl-2-phenyl-5-benzothiazolyl acetic acid having the structural formula in which a methyl group is substituted for one of the hydrogen atoms in the methylene radical, of the acetic acid group contained in the original benzothiazole compound, and which has previously never been synthesized, is found to exhibit markedly lower toxicity. Another object of the invention is to provide a compound with comparatively higher pharmacological activity owing presumably to improvement of the affinity of this compound with the organic tissues of the body and of the excretion of the compound out of the living body.

SUMMARY OF THE INVENTION

α-Methyl-2-phenyl-5-benzothiazolyl acetic acid (I) a new compound with markedly towered toxity and improved pharmocological properties, may be, for example, synthesized by, (1) hydrolysis of α-methyl-2-phenyl-5-benzothiazolyl acetonitrile; (2) decarboxylation of α-methyl-2-phenyl-5-benzothiazolyl malonic acid; or (3) a ring-closing reaction of the undermentioned amide-imidol type tautomer compounds.

These synthesizing processes for the compound (I) of the invention are further explained as follows:

1. Hydrolysis of α-methyl-2-phenyl-5-benzothiazolyl acetonitrile having the structural formula:

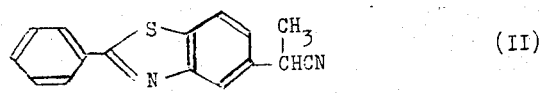

The hydrolysis of the compound (II) may be accomplished in solvent containing mineral acid or alkaline substance at room temperature or at higher temperatures, to give the desired compound of the invention. As the mineral acid in the above, hydrochloric acid, sulfuric acid, phosphoric acid and the like, may be employed. And sodium hydroxide, potassium hydroxide, calcium hydroxide, sodium carbonate, ammonia and the like, may be used as said alkaline substance.

The solvent used in the hydrolysis may be water or a mixed solution of water with organic solvent such as lower alkyl alcohol having 1–4 carbon atom(s), dioxane, tetrahydrofuran, acetone, 2-methoxymethanol, 2-ethoxyethanol or dimethylformamide.

α-Methyl-2-phenyl-5-benzothiazolyl acetonitrile (II), whose melting point is 108°–109°C, may be prepared, for example, by introducing a methyl group into 2-phenyl-5-benzothiazolyl acetonitrile with methyl iodide, said 2-phenyl-5-benzothiazolyl acetonitrile having been synthesized by reacting 2-phenyl-5-chloromethyl benzothiazole with potassium cyanide. The above 2-phenyl-5-chloromethyl benzothiazole may be synthesized through chlorination of 2-phenyl-5-hydroxymethyl benzothiazole which is prepared by esterification and subsequent reduction of 2-phenyl-5-benzothiazolyl carboxylic acid.

2. Decarboxylation of α-methyl-2-phenyl-5-benzothiazolyl malonic acid having the structural formula:

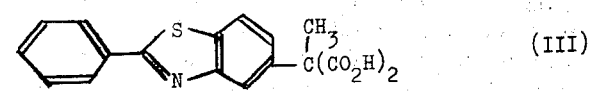

The decarboxylation of the compound (III) may be accomplished by either heating of the compound at 180°–200°C or agitation of aqueous alcoholic alkaline solution of the compound at room temperature or at higher temperatures to give the desired compound of the invention. As the alcohol in the above aqueous alcoholic alkaline solution, a lower alkyl alcohol having 1–4 carbon atom(s) may advantageously be used.

α-Methyl-2-phenyl-5-benzothiazolyl malonic acid which is the starting material in the above process, is prepared by hydrolysis of α-methyl-2-phenyl-5-benzothiazolyl malonic acid lower alkyl ester with sodium hydroxide or potassium hydroxide in an aqueous alcoholic solution followed by acidification of the thus-resulting solution with either mineral or organic acid. The above α-methyl-2-phenyl-5-benzothiazolyl malonic acid lower alkyl ester may be synthesized by methylation of 2-phenyl-5-benzothiazolyl malonic acid lower alkyl ester with methyl iodide or dimethyl sulfate in methanol or ethanol in the presence of metallic sodium or sodium alcolate. For example, 2-phenyl-5-benzothiazolyl malonic acid diethyl ester having the melting point of 132°–4°C, is synthesized by reaction of 2-phenyl-5-benzothiazolyl acetic acid ethyl ester with ethyl carbonate in sodium ethoxide.

3. A ring-closing reaction of the amide-imidol type tautomer compounds having the structural formula:

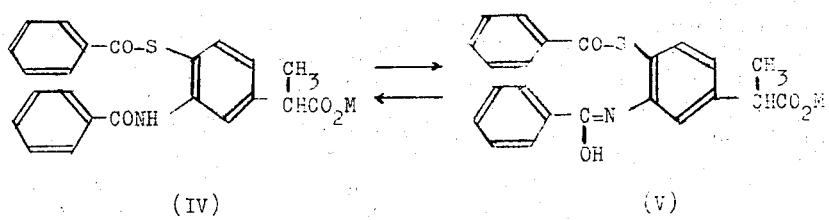

(IV)　　　　　　　　　(V)

where M is a hydrogen or alkali metal atom.

The amide type compounds (IV) in the above structural formula are α-methyl-4-benzoylthio-3-benzoylaminophenyl acetic acid or salts thereof, while the imidol type compounds (V) are α-methyl-4-benzoylthio-3-(α-hydroxybenzylidene)iminophenyl acetic acid or salts thereof. It can be recognized that those compounds referred to are amide-imidol type tautomers through infra-red spectrophotometric analysis of the compound (cf. Donald J. Cram & George S. Hammond: ORGANIC CHEMISTRY, pp. 182–184, published by McGraw-Hill Book Co. Inc., 1959; New York, Tronto, London). An example of the alkali metal in the above tautomer compounds (IV ⇌ V) is sodium or potassium.

The ring-closing reaction of the above tautomer compounds may be carried out in the following manners:

a. Heating the of tautomer compounds of acid-form without any solvent: Such heating is generally carried out in the presence of an inactive gas and/or with increased pressure at a temperature above the melting point of the reactant.

b. Heating the tautomer compounds the of acid-form in an organic solvent: As said organic solvent, the following may preferably be employed: dimethylformamide, dimethylsulfoxide or mixture of each of the said two solvents with another organic solvent selected from lower alkyl alcohol having 1–4 carbon atom(s), dioxane, tetrahydrofuran, acetone, 2-methoxyethanol and 2-ethoxyethanol.

c. Heating the tautomer compounds of acid- or salt-form in an acidic medium: Favorable examples of the acidic medium in the above are organic or inorganic acid, or a mixture of said acid with water or with organic solvent. As the acid, inorganic acid such as hydrochloric acid, sulfuric acid, phosphoric acid or polyphosphoric acid, or organic acid such as acetic acid, monochloroacetic acid, trichloroacetic acid or toluenesulfonic acid, may be employed. Further, as the organic solvent in the above, the following may advantageously be employed: aqueous lower alkyl alcohol having 1–4 carbon atom(s), aqueous 2-methoxyethanol, aqueous 2-ethoxyethanol, dioxane, aqueous dioxane, tetrahydrofuran, aqueous tetrahydrofuran, acetone or aqueous acetone.

When the tautomer compounds (IV ⇌ V) of the salt-form are used as raw material in the above process, it is necessary to treat these reactants with a strongly acidic medium. The tautomer compounds (IV ⇌ V) of the salt form in the above process are prepared for example, by reaction of sodium sulfide on α-methyl-4-halogeno-3-nitrophenyl acetic acid followed by further reaction of benzoyl chloride thereon. Thus prepared salt-form compounds may be converted into the acid-form compounds, the melting point of which is 158°–159°C, through treating the same with mineral acid.

The salts of α-methyl-2-phenyl-5-benzothiazolyl acetic acid of the present invention represent an additional aspect of the invention. These salts can readily be obtained by reaction of basic compounds on the present benzothiazolyl acetic acid compound under mild conditions. That is, there may be obtained, for example, salts of alkali metal such as sodium or potassium, aluminum salt and salts of alkaline earth metal such as calcium. Similarly, salts of organic amine such as diethylamine or triethanolamine may be obtained. Further, the present benzothiazolyl acetic acid compound may be converted into acid-addition salts with inorganic acid such as hydrochloric acid, sulfuric acid and the like, or salts with organic acid such as citric acid, lactic acid and the like.

The new compound of the present invention has higher analgesic and anti-inflammatory activity, while showing markedly lower toxicity. Thus, according to a further feature of the invention we provide pharmaceutical compositions comprising at least one compound as defined above in admixture with a physiologically compatable carrier or excipient.

The following Tables 1–3 illustrate results of toxicological or pharmacological tests of the compound according to the invention; Table 1 shows the acute toxicity using mice (50 % Lethal Dose), Table 2 shows the anti-inflammatory activity assessed by inhibition of edema formation in the rat hind-paw induced by carrageenin injection, and Table 3 relates to an analgesic activity test against pain induced by applying the acetic acid-stretching method to mice. Explaining the testing procedures further, the acute toxicity was assesses by the Litchfield-Wilcoxon method (cf. J. Pharmacol. Exp. Therap., 96(1949), 99), from the data obtained 72 hours after the oral or intraperitoneal administration of the compound to ICR mice of ten/group, each mouse weighing 15–20 g. The anti-inflammatory activity was assessed by the Winter method (cf. Proc. Soc. Exp. Biol. Med., 111(1962), 544) that is from the data obtained 3 hours after the subplantar injection of 0.05 ml. of 1 % carrageenin solution to male Wister strain rats of five/group, each rat weighing 150– 180 g. The injection of the carrageenin solution had been administered an hour after the oral administration of the compound to be tested to said rats at the rate of 100 mg./1 kg of animal weight. Further, the analgesic activity was measured with a pain-inhibition rate assessed by the Koster method (cf. Fer. Proc. 18(1959), 412), that is on the basis of the data obtained in the procedures of intraperitoneal injection of 0.6 % acetic acid solution to male ICR mice of ten/group, each mouse weighing about 20 g., at the rate of 0.6 mg. of acetic acid per 10 g. of animal weight, as well as the oral administration of the compound to said mice at the rate of 100 mg. per 1 kg of animal weight.

In all of the tests, phenylbutazone, which is the most current medicament, and 2-phenyl-5-benzothiazolyl acetic acid, which had been previously disclosed by us, were employed as control compounds.

Table 1

| Compound tested | $LD_{50}$ |
|---|---|
| compound of the invention | 2800 p.o. |
| | 1650 i.p. |
| 2-phenyl-5-benzothiazolyl acetic acid | 1365 p.o. |
| | 800 i.p. |
| phenylbutazone | 630 p.o. |
| | 372 i.p. |

Table 2

| Compound tested | Anti-inflammatory activity (Inhibition rate) |
|---|---|
| compound of the invention | 52.0 % |
| 2-phenyl-5-benzothiazolyl acetic acid | 46.7 % |
| phenylbutazone | 45.3 % |

Table 3

| Compound tested | Analgesic activity (Inhibition rate) |
|---|---|
| compound of the invention | 71.2 % |
| 2-phenyl-5-benzothiazolyl acetic acid | 64.2 % |
| phenylbutazone | 63.6 % |

SPECIFIC EMBODIMENTS

The following examples serve to illustrate the invention without limiting it any way:

EXAMPLE 1

2.64 g. (0.01 mole) of α-methyl-2-phenyl-5-benzothiazolyl acetonitrile are added to 15 ml. of concentrated hydrochloric acid, and the liquid mixture is heated under reflux for about an hour. The reacted solution is poured into ice-water to crystallize out α-methyl-2-phenyl-5-benzothiazolyl acetic acid. Thus formed crude crystals are recrystallized from benzene, the recrystallized product having a melting point of 142°–3°C. The yield is 2.58 g., corresponding to 91.2 % of the theoretical amount.

The elementary analysis (%) for $C_{16}H_{13}NO_2S$:
Calcd: C, 67.82; H, 4.63; N, 4.94.
Found: C, 67.77; H, 4.71; N, 4.89.

EXAMPLE 2

Sodium ethoxide solution is prepared by adding 1.1 g. (0.0478 mole) of metallic sodium to 52 ml. of absolute ethanol, and to this solution are added 17.2 g. (0.0465 mole) of 2-phenyl-5-benzothiazolyl malonic acid diethyl ester and further are added 10 ml. of methyl iodide while stirring. The resultant liquid mixture is heated under reflux for three hours, and thereafter the reacted solution is concentrated under reduced pressure to remove ethanol. The residue is extracted with ether, and the ether layer is washed with water, then with aqueous sodium hydrogensulfite solution and with water again. After being dried with sodium sulfate, the ether layer is concentrated under reduced pressure to remove ether, whereby a oily substance is obtained.

To the oily substance are added a mixed solution of 60 ml. of 14 % aqueous sodium hydroxide with 60 ml. of ethanol while stirring, and the resulting liquid is heated under reflux for an hour. Ethanol is distilled out of the above reacted solution under reduced pressure and the resulting aqueous alkaline solution is cooled. After the solution is washed with ether, 2N-hydrochloric acid is added thereto while stirring and cooling, so as to crystallize out α-methyl-2-phenyl-5-benzothiazolyl acetic acid. The formed crude crystals are recrystallized from a mixture of chloroform and ligroin, the melting point of the refined crystals being 142°–3°C. The yield is 9.4 g., corresponding to 71.8 % of the theoretical amount.

The elementary analysis (%) for $C_{16}H_{13}NO_2S$:
Calcd: C, 67.82; H, 4.62; N, 4.94.
Found: C, 67.77; H, 4.58; N, 4.98.

EXAMPLE 3

2.0 g. (0.00494 mole) of acid-form compounds of the amide-imidol type tautomers (IV ⇄ V) are dissolved in the mixture of 50 ml. of concentrated hydrochloric acid with 15 ml. of dioxane, and the resultant solution is heated under reflux for six hours. The reacted solution is poured into ice-water to crystallize out the α-methyl-2-phenyl-5-benzothiazolyl acetic acid. The crude crystals thus obtained are washed with hot water, and recrystallized from the mixture solution of chloroform with ligroin, the melting point of the refined product being 142°–3°C. The yield is 1.01 g., which correspond to 72.0 % of the theoretical amount.

The elementary analysis (%) for $C_{16}H_{13}NO_2S$:
Calcd: C, 67.83; H, 4.63; N, 4.94.
Found: C, 67.82; H, 4.73; N, 4.90.

EXAMPLE 4

2.0 g. (0.00468 mole) of sodium salt-form compounds of the tautomers (IV ⇄ V) are dissolved in a mixed solution of 60 ml. of concentrated hydrochloric acid with 15 ml. of dioxane. The resultant solution is heated under reflux for six hours. The reacted solution is poured into ice-water to crystallize out α-methyl-2-phenyl-5-benzothiazolyl acetic acid. The crude crystals obtained in the above are washed with hot water, and recrystallized from the mixed solution of chloroform with ligroin, the melting point of the recrystallized product being 142°–3°C. The yield is 0.99 g. which corresponds to 75 % of the theoretical amount.

The elementary analysis (%) for $C_{16}H_{13}NO_2S$:
Calcd: C, 67.83; H, 4.63; N, 4.94.
Found: C, 67.77; H, 4.50; N, 4.89.

What we claim is:

1. α-Methyl-2-phenyl-5-benzothiazolyl acetic acid represented by the structural formula:

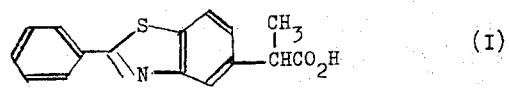

* * * * *